United States Patent [19]

Wright et al.

[11] Patent Number: 4,770,264
[45] Date of Patent: Sep. 13, 1988

[54] VEHICLE STEERING SYSTEM

[75] Inventors: Peter G. Wright, Norfolk; David A. Williams, Bedford, both of England

[73] Assignee: Group Lotus PLC, Norwich, England

[21] Appl. No.: 937,181

[22] Filed: Dec. 2, 1986

[30] Foreign Application Priority Data

Dec. 2, 1985 [GB] United Kingdom ............... 8529601

[51] Int. Cl.$^4$ ............................................. B62D 5/08
[52] U.S. Cl. ..................................... 180/140; 91/45; 92/130 D
[58] Field of Search ................... 180/140, 142; 91/45, 91/44, 41; 92/131, 130 D

[56] References Cited

U.S. PATENT DOCUMENTS

| 2,139,185 | 12/1938 | Engel | 91/44 X |
| 2,532,151 | 11/1950 | Diebert et al. | 180/140 X |
| 4,440,254 | 4/1984 | Shibahata et al. | 180/140 |
| 4,534,435 | 8/1985 | Shibahata et al. | 180/140 |

Primary Examiner—John A. Pekar
Attorney, Agent, or Firm—Young & Thompson

[57] ABSTRACT

A road vehicle has steerable front and rear wheels, the rear wheels being steered by an electro-hydraulic system responsive to the manual control input to the front wheels. The hydraulic actuator of the system is biased to the straight-ahead steering position by springs, so that the rear wheels are centered in the event of electric or hydraulic failure, and an hydraulically restrained latch element is spring biased to then latch the actuator piston in its centered position.

13 Claims, 2 Drawing Sheets

VEHICLE STEERING SYSTEM

FIELD OF THE INVENTION

The invention relates to a vehicle steering system particularly adapted to use in a vehicle having front and rear wheel steering.

BACKGROUND OF THE INVENTION

Road vehicles of which the rear wheels can be steered as well as the front wheels in many instances employ quite complicated control arrangements for the rear wheel steering gear. Such arrangements can be responsive to a variety of factors, in addition to the steering angle applied by the driver to the front wheel steering gear, for example, the vehicle body movement as sensed by one or more inertial sensors, and electrical inputs derived from such factors are treated in a computer which provides an electric command signal which is converted, for example, electro-hydraulically, into a wheel steering movement. These arrangements are necessarily subject to the possibility of failure, which would make the vehicle difficult to control and could thus result in a accident.

It is thus an object of the invention to provide a powered vehicle steering system with biassing means for returning the system to a neutral and straight ahead position in the event of system failure.

It is a further object of the invention to provide an electro-hydraulic steering system with mechanical fail safe means operative in the event of electrical and/or hydraulic failure.

It is also an object of the invention to provide means for minimising or eliminating the adverse effects of rear wheel steering system failure in a vehicle with front and rear wheel steering.

SUMMARY OF THE INVENTION

The invention provides a steering system for a vehicle, the system being adapted to assume a straight ahead wheel orientation in the event of system failure. The system can thus include biassing means permanently opposing changes of the condition of the steering system from a straight ahead condition. In the event of any failure in the control or operation of the system, the biassing means urge the system to its central position. A vehicle with front and rear wheel steering which incorporates the system for the rear wheels could then still be steered, by means of the front wheels only, by way of the conventional direct or power assisted control normally provided.

The invention thus also provides a rear wheel steering system for a vehicle with front and rear wheel steering, the system comprising means responsive to failure of control or operation to lock the system in the central steering position thereof. The steering orientation of the rear wheels is then unaffected by for example road conditions, so that steering by way of the front wheels can be affected wholly as for a conventional vehicle.

The invention can conveniently be embodied as a rear wheel steering system having a double acting hydraulic output device which operates against a centering spring or springs and of which the two interiors of the devices on opposite sides of the piston are arranged to be put in communication with each other, as through a normally closed by-pass valve, in the event of a system failure. The by-pass valve is preferably held open hydraulically, the hydraulic pressure being applied through a solenoid valve held open during normal system operation. The system is then quickly centred on either a hydraulic or an electric failure.

The hydraulic output device can also incorporate a latch element biased to engage the piston either directly or by means of a series of balls so as to lock the piston in a position corresponding to straight-ahead rear wheel orientation, the latch element being held from such engagement during normal operation of the system, as by hydraulic pressure.

Figure 1:
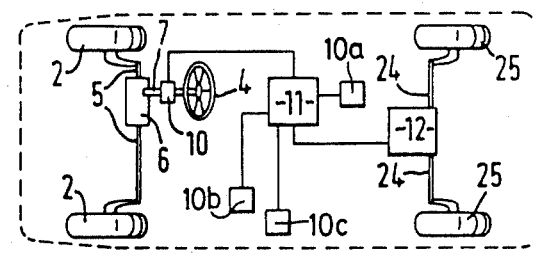
FIG. 1 is a schematic plan view of the steering arrangements of a road vehicle having a steerable front and rear wheels in accordance with the invention.

The front wheels 2 of the road vehicle of FIG. 1, which may be for example a passenger motor car, are steerable conventionally. Thus, a steering wheel 4 acts on steering tie rods 5 through a suitable connection box 6 and the steering column 7. A transducer 10 is connected to the steering column 7 so as to measure the steering angle and the transducer output is supplied to a computerised control unit 11 which in turn provides appropriate control signals to an electro-hydraulic rear wheel steering system 12 of which details appear from FIG. 2. As well as or instead of the input from the transducer 10, the control unit 11 may have any suitable input or inputs, for example, from a vehicle speed sensor 10a and/or a lateral acceleration sensor 10b or a yaw angular velocity sensor 10c.

The rear wheel steering system 12 comprises a hydraulic actuator 20 in the form of a double-acting hydraulic cylinder 21 containing a piston 22. From the opposed ends of the piston 22, tie rods 24 extend through apertures in the cylinder end walls for mechanical application to the rear wheels 25 of a steering effect in accordance with the piston position.

Externally of the actuator 20, helical compression springs 26 around the tie rods 24 act between the cylinder end walls and discs 27 carried by the tie rods, to exert a centering bias on the piston/tie rod assembly.

The interiors of the cylinder 21, on either side of the piston 22, are connected with hydraulic fluid pressure and return lines 30 and 31, which extend from a suitable hydraulic pressure source (not shown), through a servo-valve 32. The servo-valve 32 is responsive to signals from the control unit 11 to control the application of hydraulic fluid pressure to the two sides of the actuator piston 22, to effect the required steering action.

The electro-hydraulic steering system 12, incorporates fail-safe means whereby the rear-wheel steering is centralised and locked in the centre position on system failure.

Thus, there is connected in the hydraulic pressure line 30 and to the return line 31, a solenoid valve 35 which is biassed to the closed position and is energised under control of the control unit 11 during normal operation of the system so as to assume its open position and thus allow fluid pressure to be applied to the actuator 20. Also, a by-pass valve 36, biassed to assume its open position, is located in a by-pass path 39 connecting the pressure lines extending between the servo-valve 32 and the respective working volumes of the actuator cylinder 21. The pressure line 30 is connected to the by-pass valve 36 by a line 40 and the fluid pressure retains this valve in its closed condition during normal operation of the system.

Because the solenoid valve 35 is held open during normal operation of the system under control of the control unit 11, it will close in the event of any failure of the electrical supply, or of the control unit, so the actuator 20 and the by-pass valve 36 are cut off from fluid pressure. Failure of hydraulic pressure can be arranged to cause the valve 35 to close also. Additionally, signals are supplied to the control unit 11 by two position sensing transducers 49, in the form of linear variable displacement transformers, which are connected between a central external flange on the cylinder 21 and respective ones of the discs 27. The control unit 11 is arranged to effect closure of the solenoid valve 35 if the transducers 49 supply inconsistent outputs or if the actuator piston position is not in accordance with the position commanded by the unit.

Closure of the solenoid valve 35 or loss of pressure in the line 40 for any other reason results in a pressure drop to the by-pass valve 36, enabling this to open to connect together the two working chambers of the actuator cylinder 21. The cylinder 22 is thus able to move freely, and the compression springs 26 will centralise the cylinder position and thus that of the wheels 25.

The illustrated rear wheel steering system of the invention also includes means whereby the steering actuator 20 is then positively locked in its central position.

The actuator piston 22 is thus provided with axially central peripheral groove 50, and the cylinder 21 has a cylindrical extension portion 51 extending from the axial centre of the cylinder with its axis perpendicular to the cylinder axis. A lock pin 52 is slidably received within the extension portion 41 and is urged by a compression spring 54 acting between the remote end of the pin and the end wall of the extension portion to move into the cylinder. The extension portion 51 is however in communication with the pressure line 30 through a branch line 55, and the fluid pressure normally holds the lock pin 52 out of the main cylinder, with the spring 54 compressed.

Loss of pressure in the branch line 55 due for example to closure of the solenoid valve 35 causes the pressure in the cylinder extension portion 51 to drop to a level at which it is no longer sufficient to overcome the force of the spring 54 which will consequently urge the pin 52 into the groove 50 in the piston, so that the steering tie rods are locked against movement. The inner end of the pin 52 is tapered, to facilitate entry of the pin into the groove 50, the side walls of which are correspondingly frustoconcial, so that entry of the pin has a centering effect.

Thus, closure of the solenoid valve 35 results in prompt centralisation and locking of the rear wheel steering system. When the solenoid valve 35 is subsequently energised, hydraulic pressure reaches both the by-pass valve 36 and the cylinder extension portion 51, to close the by-pass valve and to return the steering lock pin 52 to its withdrawn position, thereby enabling resumed control of the rear wheel steering by way of the servo valve 32 and actuator 20.

Figure 2:
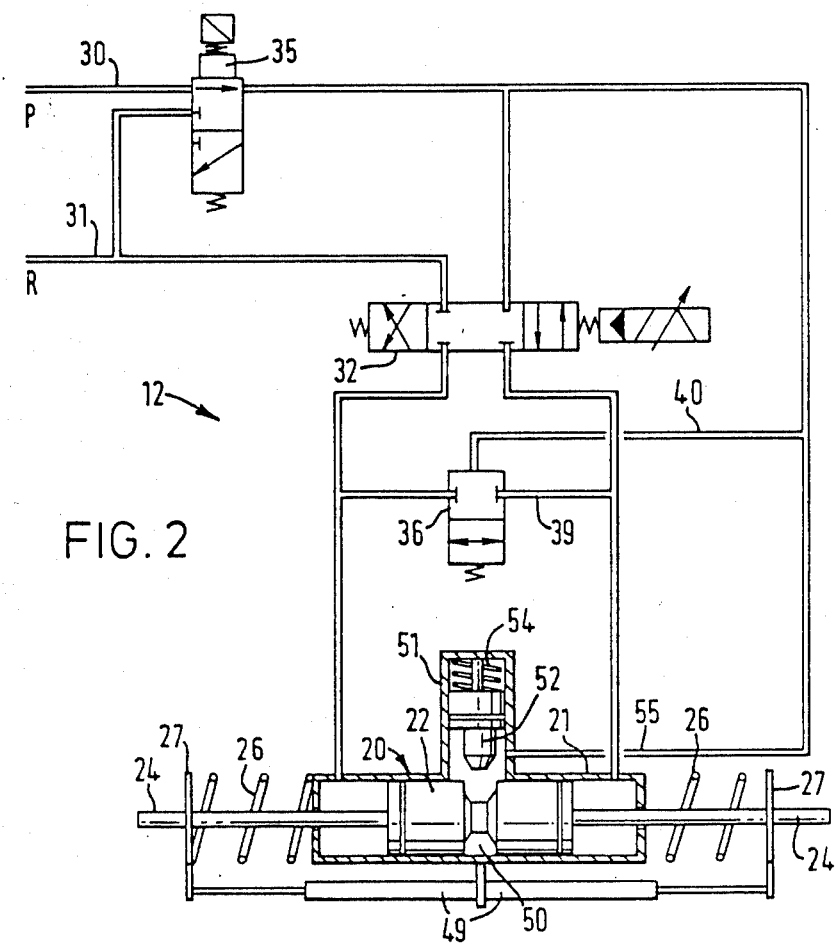
FIG. 2 is a schematic view showing in detail the rear wheel steering system of the vehicle of FIG. 1, the system being shown in a normal operating condition.
Figure 3:
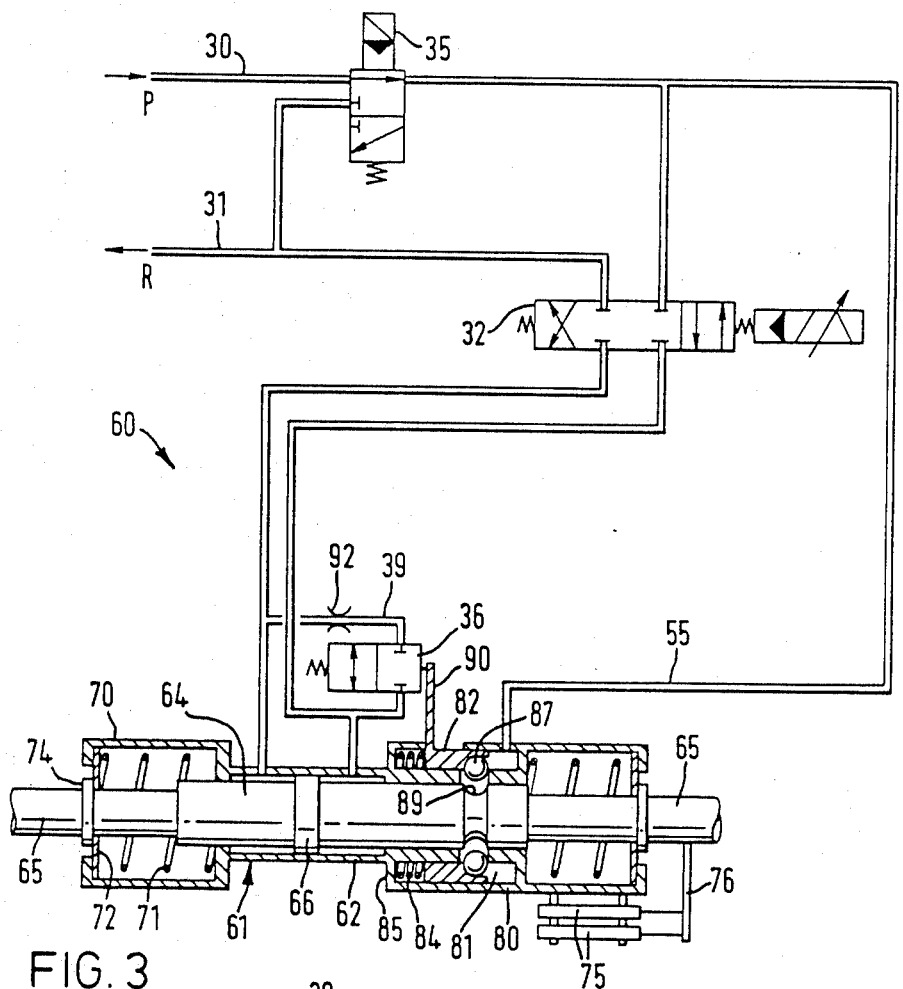
FIG. 3 is a view similar to that of FIG. 2 of an alternative form of rear wheel steering system for the vehicle of FIG. 1.
Figure 4:
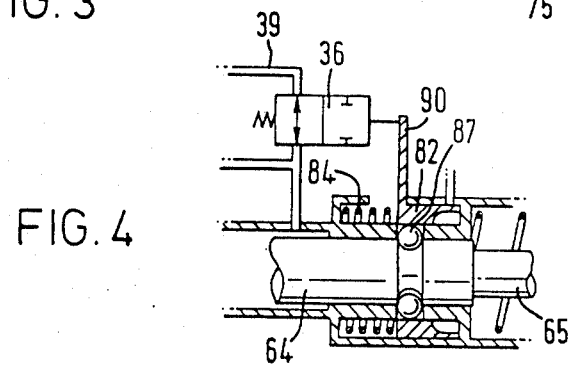
FIG. 4 is a like view of part of FIG. 3 but showing the system in locked position.

In the modified rear wheel steering system 60 shown in FIGS. 3 and 4, parts identical to those of the system 12 shown in FIG. 2 are indicated by the same reference numerals. The system 60 comprises a double-acting hydraulic actuator 61 with a cylinder 62 within which slides a piston member 64 having tie rod portions 65 at its outer ends which protrude externally of the cylinder ends. A sealing portion 66 of the piston member 64 separates the cylinder interior into two parts communicating with the pressure and return lines 30, 31 under control of the servo-valve 32.

At each end, the actuator 61 mounts a housing 70 containing a compression spring 71 acting between the adjacent actuator end and a washer 72 trapped within the housing by an outer end flange thereof and acted upon by the associated tie rod portion 65 by way of a flange 74. The springs 71 thus exert a centering force on the piston member 64, tending to return the system to the central of straight-ahead condition shown in FIG. 3. Linear variable displacement transformers 75 extend between the right hand housing 70 of the actuator 61 and a side arm 76 on the associated tie rod 65. These transformers 75 constitute an alternative to the transformers 49 of FIG. 2 for providing to the control unit 11 signals representing tie rod position.

Like the system 12, the system 112 incorporates means for releasably locking the system in the straight-ahead condition on system failure. Adjacent the right-hand spring housing 70, the actuator 61 has a sleeve portion 80 defining an annular chamber 81 extending around the cylinder 62. The chamber 81 has a part adjacent the sleeve 70 by which it normally receives fluid pressure by way of the branch line 55 extending from the pressure line 30. A sleeve piston 82 is slidably received around the cylinder 62, with one end extending into the annular chamber 81 to be acted upon by the fluid pressure therein. The opposite end of the piston 82 protrudes from the chamber 81 and is acted upon by a compression spring 84 retained by a flange 85 at the exterior of the cylinder 62. The chamber 81 communicates with interior of the cylinder 62 by means of a series of holes in the cylinder wall through which balls 87 can move radially between the chamber 81 and an annular groove 89 provided in the piston member 64 in sliding engagement with the cylinder wall.

The sleeve piston 82 carries a radially projecting side arm 90 externally of the chamber 81 by which it controls the position of the by-pass valve 36, in the by-pass 39 which is provided with a retraction 92.

In the position shown in FIG. 3, pressure in the branch line 55 acts on the sleeve piston 82 to urge it leftwards, compressing the compression spring 84. The piston member 64 can then move to left or right by action of fluid pressure on the two sides of the sealing portion 66 under control of the servo-valve 32, the balls 87 being urged outwardly from the groove 89, into the chamber 81 by the sides of the groove to permit the piston member movement. In this position of the piston 82, the side arm 90 keeps the by-pass valve 36 in its closed condition.

If the fluid pressure supply should fail for example because of closure of the solenoid valve 35, the compressed spring 84 is able to move the sleeve piston 82 to the right, its inner end being shaped to then urge the balls 87 radially inwardly. The side arm 90, in this position of the piston 82, causes the bypass valve 36 to open, so that the piston member 64 is free to move under the centering effect of the springs 71, the rate of return to center being regulated by the restriction 92. When the center position, shown in FIG. 4, is reached the balls 87 enter the groove but still engage the edges of the holes in the cylinder wall, so that the piston member 64 is latched to the cylinder 62. The slot and groove 89 are so disposed that the system is then in its central or straight-ahead condition. When fluid pressure is restored, pressure in the branch line 55 moves the sleeve piston 82 back to the position shown in FIG. 3 so that normal operation can recommence.

It is event that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. A steering control system for a vehicle having steering wheel means, said system comprising:
    a power source, said power source comprising a pressure fluid circuit,
    an actuator adapted to apply power from said power source to effect steering movement of said steerable wheel means, said actuator comprising an hydraulic actuator included in said pressure fluid circuit, said actuator having a piston therein,
    control means for controlling said application of power to said actuator, said control means comprising a control unit adapted to provide a command signal and a servo-valve included in said pressure fluid circuit and responsive to said command signal to operate said hydraulic actuator,
    centering means adapted to effect movement of said wheel means to the straight ahead condition thereof on failure of said system,
    a latch cylinder,
    a latch piston movable in said latch cylinder and held by fluid pressure in normal operation of said system in a first position,
    spring means biassing said latch piston to a second position, and
    ball means held by said latch piston in said second position thereof in latching engagement with said actuator piston to hold said actuator piston against axial movement, said ball means being movable by said actuator piston out of said latching engagement in said first position of said latch piston.

2. The steering control system of claim 1 wherein said latch piston and cylinder are annular and surround said hydraulic actuator, and wherein said ball means comprises a series of balls receivable in an annular groove in said actuator piston.

3. The steering control system of claim 2 further comprising a by-pass in said hydraulic supply circuit, and a by-pass valve in said by-pass held closed by said latch piston in said first position and opened by said latch piston in said second position thereof.

4. A steering control system for a vehicle having steerable wheel means, said system comprising:
    a power source,
    an actuator adapted to apply power from said power source to effect steering movement of said steerable wheel means,
    control means for controlling said application of power to said actuator,
    a signal source providing at least one of predetermined and command dependent signals to said control means,
    sensor means adapted to supply to said control means signals dependent on the steering position of said steerable wheel means, and
    centering means adapted to effect movement of said wheel means to the straight ahead condition thereof on failure of said system.

5. A steering control system for a vehicle having steerable wheel means, said system comprising:
    a power source, said power source comprising a pressure fluid circuit,
    an acutator adapted to apply power from said power source to effect steering movement of said steerable wheel means, said actuator comprising an hydraulic actuator included in said pressure fluid circuit and having a piston therein,
    tie rod means extending axially of said hydraulic actuator from said piston,
    control means for controlling said application of power to said actuator, said control means comprising a servo-valve included in said pressure fluid circuit and responsive to a command signal to operate said hydraulic actuator, and a control unit for providing said command signal,
    centering means adapted to effect movement of said wheel means to the straight ahead condition thereof on failure of said system, said centering between said tie rods and said hydraulic actuator, and
    linear variable displacement transformers connected between said actuator and said tie rod means, said control means being responsive to the outputs of said linear variable displacement transformers to move said system to said straight-ahead condition if the transformer outputs are inconsistent or indicate a steering position at variance wtih a position commanded by said command signal.

6. A steering control system for a vehicle having steerable wheel means, said system comprising:
    a power source, said power source comprising a pressure fluid circuit,
    an actuator adapted to apply power from said power source to effect steering movement of said steerable wheel means, said actuator comprising an hydraulic actuator included in said pressure fluid circuit and having a piston therein,
    control means for controlling said application of power to said actuator, said control means comprising a servo-valve included in said pressure fluid circuit and responsive to a command signal to operate said hydraulic actuator, and a control unit for providing said command signal,
    centering means adapted to effect movement of said wheel means to the straight ahead condition thereof on failure of said system, and
    a solenoid valve in said pressure fluid circuit, said solenoid valve being biassed to a position thereof preventing pressure fluid flow in said circuit and being held in a position permitting said flow by a signal from said control unit.

7. In a steering control system for a vehicle having two wheels steerably mounted at spaced locations on opposite sides of said vehicle, an actuator means operable to effect steering of said wheels, said actuator means comprising:

a cylinder, a piston assembly comprising a piston movable within said cylinder interior between the ends thereof and tie rods extending from said piston in opposed directions outwardly of said cylinder to respective ones of said wheels, whereby movement of said piston effects steering movement of said wheels, fluid pressure ports in said cylinder whereby said piston can be moved by fluid pressure to a position corresponding to a selected steering position of said wheels, centering means biassing said wheels to the straight-ahead positon thereof, said centering means comprising springs acting between said cylinder and said piston assembly, and latching means for latching said wheels in said straight-ahead position, said latching means comprising at least one latch element movable to engage and hold said piston assembly in said straight-ahead position of said wheels, spring means biassing said latch element to so engage said piston, and fluid pressure means adapted to maintain said latch element out of engagement with said piston.

8. The steering control system of claim 7 further comprising a control unit providing a command signal, a pressure fluid circuit having connected therein said fluid pressure ports and said fluid pressure means, and a servo-valve connected in said circuit and responsive to said command signal to effect said movement of said piston by said fluid pressure.

9. The steering control system of claim 8 further comprising a by-pass extending in said pressure fluid circuit between said fluid pressure ports, a valve in said by-pass, means biassing said by-pass valve to its open position, and means applying fluid pressure in said pressure fluid circuit to said by-pass valve to hold said by-pass valve in its closed position.

10. The steering control system of claim 8 further comprising a solenoid valve in said pressure fluid circuit, said solenoid valve being biassed to a position thereof preventing pressure fluid flow in said circuit and being held in a position permitting said flow by a signal from said control unit.

11. The steering control system of claim 8 further comprising sensor means adapted to supply to said control unit signals dependent on at lest one vehicle condition for comparison with said command signal.

12. The steering control system of claim 11 wherein said sensor means is responsive to at least one of vehicle steering position, vehicle speed, vehicle acceleration, and vehicle attitude.

13. The steering control system of claim 7 wherein said latch element comprises a latch pin, and wherein at least one of the said latch pin and said piston assembly has a tapered configuration whereby movement of said latch pin to engage said piston assembly urges said piston assembly into a straight-ahead position thereof.

* * * * *